United States Patent [19]

Dowbenko et al.

[11] 4,285,849

[45] Aug. 25, 1981

[54] AMIDATION REACTION PRODUCTS OF POLYAMINES AND POLYCARBOXYL CONTAINING MATERIALS AND COATING COMPOSITIONS CONTAINING SAME

[75] Inventors: Rostyslaw Dowbenko, Gibsonia; Karl F. Schimmel, Verona; Jerome A. Seiner, Pittsburgh, all of Pa.

[73] Assignee: PPG Industries, Inc., Pittsburgh, Pa.

[21] Appl. No.: 97,619

[22] Filed: Nov. 27, 1979

[51] Int. Cl.$^3$ .................. C08L 61/10; C08L 61/20
[52] U.S. Cl. .................. 260/29.6 NR; 260/29.2 EP; 260/29.2 UA; 260/29.2 N; 260/29.3; 260/29.4 R; 260/29.4 UA; 260/29.2 TN; 427/386; 427/388.2; 427/388.3; 427/388.4; 525/113; 525/119; 525/423; 525/438; 525/939
[58] Field of Search .............. 525/113, 119, 423, 438, 525/939; 260/29.6 NR, 29.2 EP, 29.2 UA, 29.2 N, 29.2 E, 29.3, 29.4 R, 29.4 UA, 29.2 TN; 427/386, 388.2, 388.3, 388.4

[56] References Cited

U.S. PATENT DOCUMENTS

| | | | |
|---|---|---|---|
| 2,643,958 | 6/1953 | Kleiner et al. | 427/352 |
| 2,845,408 | 7/1958 | Melamed | 478/379 |
| 3,642,393 | 8/1969 | Legler | 528/107 |
| 3,786,113 | 1/1974 | Vassileff | 525/113 |
| 3,945,963 | 3/1976 | Levine et al. | 260/29.6 NR |
| 4,120,839 | 10/1978 | Emmons et al. | 260/29.2 EP |
| 4,162,931 | 7/1979 | Yeakey et al. | 525/423 X |
| 4,167,498 | 9/1979 | Waddill | 260/29.2 EP X |

Primary Examiner—Ronald H. Smith
Assistant Examiner—Thurman K. Page
Attorney, Agent, or Firm—Charles R. Wilson

[57] ABSTRACT

Ungelled amidation reaction products of a polycarboxyl-containing material and a polyamine having at least one ether group are produced. The ungelled products can be mixed with a crosslinking resin to provide a coating composition having good durability and stain-resistance.

31 Claims, No Drawings

4,285,849

AMIDATION REACTION PRODUCTS OF POLYAMINES AND POLYCARBOXYL CONTAINING MATERIALS AND COATING COMPOSITIONS CONTAINING SAME

BACKGROUND OF THE INVENTION

The subject invention relates to amidation reaction products and their use in coating compositions. More particularly, the invention relates to the use of amidation reaction products derived from oxyalkylene alkyl polyamines and polycarboxyl-containing polymers.

Organic solvent-soluble and water-soluble or -reducible addition interpolymers containing pendent carboxyl groups and pendent amine groups formed from the reaction of a carboxy-containing interpolymer with an alkylenimine are known in the art. U.S. Pat. Nos. 3,719,629, Martin et al, Mar. 6, 1973, and 3,945,963, Levine et al, Mar. 23, 1976 are illustrative of such copolymers. The copolymers of U.S. Pat. No. 3,719,629 are polymeric amine salts. That is, the salt groups are provided by reacting basic groups with an acid. However, this does create problems. For example, the cationic nature of the copolymer prevents it from being readily formulated into a coating composition by blending it with the conventional anionic modifiers normally employed in coating compositions. Additionally, the acid salt cannot be satisfactorily employed as a coating material for unprimed metal substrates since such acid salts usually cause flash rusting. U.S. Pat. No. 3,945,963 describes emulsions of acrylic interpolymers in combination with certain epoxy derived resins. While films formed from the aforedescribed coating systems are satisfactory in many respects, the compositions themselves are difficult to apply due to their relatively short storage stability.

U.S. Pat. No. 4,104,230, Chang et al., Aug. 1, 1978, describes two-package polymeric compositions based upon a polyepoxide and an addition interpolymer. The addition interpolymer contains a polymeric backbone of two or more ethylenically-unsaturated monomers with at least one monomer containing carboxyl groups, said backbone containing pendent amine groups formed by reacting part of the carboxyl groups with an alkylenimine and pendent salt groups formed by reacting part of the carboxyl groups with a base. The disclosed compositions are intended to be dispersed or dissolved in water. Films formed from the disclosed compositions are satisfactory and, additionally, the compositions themselves are storage stable for prolonged periods of time. However, it has been found the alkylenimine used to form the addition interpolymers creates health hazards unless elaborate precautions are taken. The additional processing equipment required when using the alkylenimine necessarily results in a higher product cost.

Amino polymers derived from carboxyl-containing interpolymers wherein an alkylenimine is not used in the processing also are known. For example, U.S. Pat. No. 4,120,839, Emmons et al., Oct. 17, 1978, describes oligomeric polymers based on the reaction product of an alkylene polyamine and low molecular weight addition polymers containing units of alkyl methacrylate and alkyl acrylate. As evident by the disclosure, however, the production of such aminolysis products is difficult due to the lengthy reaction times and high temperatures needed to obtain reasonable yields.

There is a need for amino-containing polymers which can be produced by an economical and safe method. Additionally, the reaction products must be stable and be water-soluble or -reducible. According to the invention herein, amine group-containing reaction products are disclosed. The reaction products can be blended with a crosslinking resin and used in a coating composition.

As used herein, all percents and ratios are by weight unless otherwise indicated.

SUMMARY OF THE INVENTION

Ungelled amidation products containing primary and/or secondary amine groups and carboxyl groups are obtained by the reaction of a polyamine containing aliphatic amine groups and having at least one ether group with a polycarboxyl-containing material. The polycarboxyl-containing material is preferably an addition interpolymer formed from at least one polymerizable ethylenically-unsaturated carboxylic acid monomer with one or more other polymerizable ethylenically-unsaturated monomers. The ungelled reaction product is especially useful when blended with a crosslinking agent and used as part of an aqueous two-package coating composition.

DETAILED DESCRIPTION OF THE INVENTION

The amine group containing products of the invention are prepared by reacting a polyamine containing aliphatic amine groups and having at least one ether group with a polycarboxyl-containing material. Methods of making the product, as well as its combination with crosslinking resins, are described in more detail in the following paragraphs.

The backbone of the subject ungelled resins are polycarboxyl-containing materials. Such materials include acrylics, polyesters and polyamides, with the acrylics being preferred. Acrylic polymers are derived from polymerizable ethylenically-unsaturated carboxylic acids and one or more other polymerizable ethylenically-unsaturated monomers. Examples of the unsaturated carboxylic acids include the alpha-beta ethylenically-unsaturated monocarboxylic acids such as acrylic acid, methacrylic acid, maleic acid, fumaric acid and itaconic acid. The preferred ethylenically-unsaturated carboxylic acids are the alpha-beta ethylenically-unsaturated monocarboxylic acids such as acrylic acid and methacrylic acid.

The other monomer or monomers used in forming the polymer include the esters of unsaturated acids such as those mentioned above. Especially useful are the alkyl acrylates and alkyl methacrylates wherein the alkyl group contans from about 1 to about 20 carbon atoms, preferably from about 1 to about 8 carbon atoms. These esters include methyl methacrylate, ethyl methacrylate, propyl methacrylate, butyl methacrylate, isobutyl methacrylate, isobornyl methacrylate, cyclohexyl methacrylate, ethyl acrylate, propyl acrylate, butyl acrylate, isobutyl acrylate and cyclohexyl acrylate. Still other monomers include monoolefinic and diolefinic hydrocarbons, e.g., styrene, alpha-methyl styrene, halo-substituted styrenes, vinyl toluene, vinyl naphthalene, allyl alcohol, 1,3-butadiene, and isoprene; unsaturated amides, e.g., acrylamide and methacrylamide; and unsaturated nitriles, e.g., methacrylonitrile. The aminolysis-resistant monomers described in commonly assigned Ser. No. 771,134, "Addition Interpolymers Having Improved Stability And Two-Package Compositions Comprising Such Interpolymers and Polyepoxides", filed Feb. 23, 1977 and now abandoned (the disclosure of which is herein incorporated by reference) are preferred monomers.

The acrylic polymers containing the pendent carboxyl groups and pendent organic groups are prepared by interpolymerizing from about 3 percent to about 75 percent, preferably from about 10 percent to about 50 percent, of the ethylenically-unsaturated carboxylic acid monomers and from about 25 percent to about 97 percent, preferably from about 50 percent to about 90 percent, of the other ethylenically-unsaturated monomers. Alternatively, acrylic polymers having only pendent ester groups can be used as the starting reactant, provided a part of the ester groups are hydrolyzed to carboxyl groups. This hydrolysis can take place during the reaction with the polyamine (as later described) provided water is present.

Conventional vinyl addition solution polymerization techniques and procedures are used in interpolymerizing the polymerizable ethylenically-unsaturated carboxylic acid and other monomers. Thus, the monomer mixture is ordinarily polymerized in an organic solvent or organic solvents in which the monomers are soluble and in the presence of a suitable catalyst, usually under controlled elevated temperatures with agitation until the polymerization reaction is complete. Various modifications used in solution polymerization reactions such as stepwise addition of the monomer mixture during polymerization, incremental addition of catalyst, polymerization under an inert atmosphere, continuous or batch polymerization and similar procedures may be employed. Such polymerization techniques are well known.

In polymerizing the monomers, any suitable organic solvent can be used. Solvents include alcohols, such as propanol, butanol, or other lower alkanols; ketones, such as methyl ethyl ketone; aromatic hydrocarbons, such as xylene and toluene; water-soluble or water-miscible organic solvents, such as ethylene glycol monobutyl ether, ethylene glycol monoethyl ether, diethylene glycol monoethyl ether, propylene glycol monomethyl ether and dipropylene glycol monomethyl ether. Mixtures of the above water-soluble or water-miscible organic solvents and water can also be used in the polymerization reaction.

Preferred catalysts used in the polymerization step include the azo compounds, e.g., alpha, alpha' azobisisobutyronitrile; peroxides, such as benzoyl peroxide, cumene hydroxy peroxide, tertiary butyl perbenzoate, and tertiary butyl peracetate. Usually from about 0.1 percent to about 10 percent, based on monomer solvents, of catalyst is used.

If polymers of relatively low molecular weight are desired, a chain modifying agent or chain transfer agent is ordinarily added to the polymerization mixtures. Such agents include the mercaptans, e.g., dodecyl mercaptan, tertiary dodecyl mercaptan, octyl mercaptan and hexyl mercaptan.

Other chain transfer agents include cyclopentadiene, allyl carbamate, alpha methyl styrene and alpha methyl styrene dimers.

In the polymerization of the monomers, the polymerization temperature ranges from about 25° C. to about 280° C., preferably from about 90° C. to about 150° C. The specific temperatures employed vary considerably, depending on the specific monomers employed, the use of catalysts, and other conditions.

Saturated polyester resins having pendent carboxyl groups can also form the backbone of the resins of this invention. The saturated polyesters are derived from saturated polycarboxylic acids, preferably dicarboxylic acids, and mixtures of polyhydric alcohols having an average functionality greater than 2. As used herein, aromatic polycarboxylic acids having unsaturation only in the aromatic ring are considered saturated since the aromatic double bonds do not react by addition. Examples of such acids include phthalic acid, isophthalic acid, adipic acid, azelaic acid, sebacic acid and their anhydrides where they exist. Commonly used polyhydric alcohols are ethylene glycol, propylene glycol, diethylene glycol, dipropylene glycol, butylene glycol, glycerol, trimethylol propane, pentaerythritol and sorbitol.

The reaction conditions and catalysts used in making the polyesters are well known. The equivalent ratio of polycarboxylic acid to polyhydric alcohol ranges from about 2:1 to about 1:1.

Other useful polycarboxyl-containing materials are the polyamide class of resins. The polyamide resins are made by condensing a diamine with a dibasic carboxylic acid. They are characterized by recurring amide groups, —CONH—, as an integral part of the main polymer chain. Examples of diamines used in making the polyamide resins are ethylenediamine, diethylenetriamine, and hexamethylenediamine. The dicarboxylic acids used in the reaction are those listed above in connection with the production of the polyester resins with the preferred acids being adipic acid, sebacic acid, succinic acid, glutaric acid and azelaic acid. The equivalent ratio of diamine to dicarboxylic acid in the polyamide resins ranges from about 1.5:1 to about 1:2. Known procedures are used for making the resins.

The carboxyl content of preferred polycarboxyl-containing material ranges from about 0.5 milliequivalents to about 12 milliequivalents of carboxyl per gram. The more preferred carboxyl content ranges from about 1 milli-equivalent to about 10 milliequivalents of carboxyl per gram.

The ungelled amidation products of the invention are prepared by reacting the above-described materials containing pendent carboxyl groups with a polyamine containing aliphatic amine groups and having at least one ether linkage. One class of polyamines has the formula:

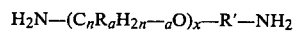

$$H_2N-(C_nR_aH_{2n-a}O)_x-R'-NH_2$$

where n is from 2 to 6, a is from 0 to 2, R is H, $CH_3$ or $C_2H_5$, x is from 1 to 60 and R' is an alkylene group having from 2 to 6 carbon atoms. Preferably, x ranges from 1 to 40. Examples of suitable polyamines are as follows:

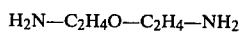

$H_2N-C_2H_4O-C_2H_4-NH_2$

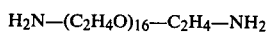

$H_2N-(C_2H_4O)_{16}-C_2H_4-NH_2$

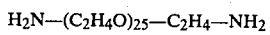

$H_2N-(C_2H_4O)_{25}-C_2H_4-NH_2$

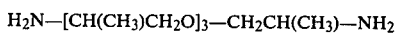

$H_2N-[CH(CH_3)CH_2O]_3-CH_2CH(CH_3)-NH_2$

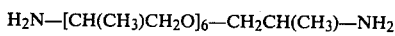

$H_2N-[CH(CH_3)CH_2O]_6-CH_2CH(CH_3)-NH_2$

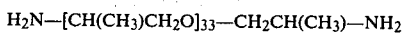

$H_2N-[CH(CH_3)CH_2O]_{33}-CH_2CH(CH_3)-NH_2$ $H_2N-(C_4H_8O)_3 C_4H_8-NH_2$ $H_2N-C_3H_6O-CH_2C(CH_3)_2CH_2O-C_3H_6-NH_2$ $H_2N-C_3H_6O-C_4H_8O-C_3H_6-NH_2$

Another class of polyamines useful herein has the formula:

$[H_2N-(C_nR_aH_{2n-a}O)_x]_y-Z$ where n is from 2 to 4, a is from 0 to 2, R is H, $CH_3$ or $C_2H_5$, x is from 1 to 60, y is 2 or 3 and Z is an alkyl, aryl or alkylaryl group. Preferably, x ranges from 1 to 40 and the alkyl and alkylaryl groups contain from about 1 to about 20 carbon atoms. A specific example of such a polyamine is:

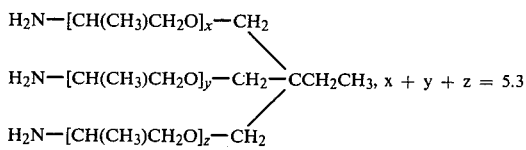

Other polyamines useful in the above described reaction are the polyamines resulting from the ring opening reaction of a polyepoxide containing ether groups with ammonia. Such ungelled reaction products are referred to herein as ammonia defunctionalized epoxide resins. A suitable class of polyepoxides are the polyglycidyl ethers of polyphenols, such as bisphenol-A. These are produced by etherification of a polyphenol with epichlorohydrin in the presence of an alkali. The phenolic compound can be 1,1-bis (4-hydroxyphenyl) ethane; 1,1-bis (4-hydroxyphenyl) isobutane; 2,2-bis (4-hydroxytertiarybutylphenyl) propane; bis (2-hydroxynaphthyl) methane; 1,5-dihydroxynaphthalene; and 1,1-bis (4-hydroxy-3-allylphenyl) ethane. Another useful class of polyepoxides are produced similarly from polyphenol resins. Also suitable are the similar polyglycidyl ethers of polyhydric alcohols which are derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, and 2,2-bis (4-hydroxycyclohexyl) propane. The above-described polyepoxide resins are reacted with ammonia. This reaction involves a simple ring opening reaction where the resultant ungelled product is the amine terminated product of the polyepoxide resin. The ammonia used can be an aqueous solution of anhydrous ammonia. It is desired that substantially all of the 1,2-epoxy groups in the polyepoxide resin react with the ammonia. Thus, a molar excess of the ammonia to epoxy groups is used in the reaction. Molar excesses of the ammonia of up to 10:1 or even higher can be used, with the unreacted excess ammonia being later removed. The reaction of the polyepoxide resin with the ammonia occurs over a range of temperatures, preferably from about 30° C. to about 100° C. The time of the reaction varies according to the temperature used, but generally ranges from about 2 to 5 hours. The aforedescribed conditions are necessary to minimize further reaction of the produced primary amine with epoxy groups to form a highly polymerized or gelled product.

The equivalent ratio of the above described materials containing pendent carboxyl groups and polyamines is important to obtaining an ungelled product. The equivalent ratio of the polyamine to the carboxyl-containing polymer ranges from about 3:1 to about 1:4, preferably from about 1.5:1 to about 1:1.5. The reaction temperatures and time can vary considerably; however, it is preferred that a temperature of from about 25° C. to about 250° C., preferably from about 85° C. to about 195° C., is used with a reaction time ranging from about 0.1 hours to about 48 hours, preferably from about 0.5 hours to about 8 hours.

The resultant reaction product is an ungelled amidation polymer which is storage stable for substantial lengths of time. The ungelled amidation product contains primary amine groups, secondary amine groups, or a mixture thereof and carboxyl groups. The amidation products have an acid number of at least 5, preferably from about 10 to about 500, more preferably from about 15 to about 300 and amine equivalent values of from about 100 to about 5000, preferably from about 200 to about 2000. The products can be stored for at least one year at 50° C.

The ungelled reaction products are useful for forming a film, per se, but preferably are blended with a crosslinking resin and then coated onto a substrate to form a curable film having a desired set of characteristics. The compositions can be organic solvent-based or water-based. Preferably, however, the compositions are water-based. In such case, remaining pendent carboxyl groups on the ungelled resin may be neutralized with a base, e.g., alkali metal hydroxides or amines such as ethylamine, butylamine, dimethylamine, cyclohexylamine, morpholine, monoethanolamine, diethanolamine, dimethylethanolamine and diethylethanolamine. Water-solubilizing or -dispersing in this manner is well known. Alternatively, an excess of diamine used in the reaction with the polycarboxyl-containing polymer can neutralize any remaining pendent carboxyl groups.

Crosslinking resins used as part of the coating compositions are selected from the group consisting of polyepoxide resins, aminoplast resins, phenoplast resins, polyisocyanate resins, blocked or semi-blocked polyisocyanate resins and mixtures thereof. The following paragraphs illustrate these crosslinking resins. The polyepoxide resins are preferred.

A wide variety of polyepoxides may be utilized in the compositions of this invention, provided they have a 1,2-epoxy equivalence greater than 1.0, i.e., the average number of 1,2-epoxy groups per molecule is greater than 1. Preferred polyepoxides have a molecular weight below about 6,000. The polyepoxide can be any of the well-known epoxides, such as, for example, those described in U.S. Pat. Nos. 2,467,171; 2,615,007; 2,716,123; 3,030,336; 3,053,855 and 3,075,999. A useful class of polyepoxides are the polyglycidyl ethers of polyphenols, such as bisphenol A, produced, for example, by etherification of a polyphenol with epichlorohydrin or dichlorohydrin in the presence of an alkali. The phenolic compound may be bis(4-hydroxyphenol)-2,2-propane; 4,4'-dihydroxybenzophenone; bis(4-hydroxyphenyl)1,1-ethane; bis(4-hydroxyphenyl)1,1-isobutane; bis(4-hydroxytertiarybutylphenyl)2,2-propane; bis(2-hydroxynaphthyl)methane; and 1,5-dihydroxynaphthalene. Another quite useful class of polyepoxides are produced similarly from Novolak resins or similar polyphenol resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, and bis(4-hydroxycyclohexyl)-2,2-propane.

There can also be used polyglycidyl esters of polycarboxylic acids which are produced by the reaction of epichlorohydrin or a similar epoxy compound with an aliphatic or aromatic polycarboxylic acid, such as oxalic acid, succinic acid, glutaric acid, terephthalic acid, 2,6-naphthylene dicarboxylic acid, and dimerized linolenic acid. Examples are diglycidyl adipate and diglycidyl phthalate.

In addition, polyepoxides derived from the epoxidation of an olefinically unsaturated alicyclic compound may also be employed. Included are diepoxides comprising in part one or more monoepoxides. These polyepoxides are non-phenolic and are obtained by epoxidation of alicyclic olefins, for example, by oxygen and selected metal catalysts, by perbenzoic acid, by acetaldehyde monoperacetate, or by peracetic acid. Among such polyepoxides are epoxyalicyclic ethers and esters, which are well known in the art.

Another class of polyepoxides which may be employed are those containing oxyalkylene groups in the epoxy molecule. Polyepoxides containing oxyalkylene groups can be produced by reacting some of the epoxy groups of a polyepoxide, such as the polyepoxides mentioned above, with a monohydric alcohol containing oxyalkylene groups.

Other epoxy-containing compounds and resins which may be employed include nitrogeneous diepoxides such as disclosed in U.S. Pat. No. 3,365,471; epoxy resins from 1,1-methylene bis(5-substituted hydantoin), U.S. Pat. No. 3,391,097; bis-imide containing diepoxides, U.S. Pat. No. 3,450,711; heterocyclic N,N'-diglycidyl compounds, U.S. Pat. No. 3,503,979; amino epoxyphosphonates, British Pat. No. 1,172,916; ;1 and 1,3,5-triglycidyl isocyanurates.

In some instances, chain-extended polyepoxide adducts may be employed to impart a desired property to films formed from the compositions of the invention, such as, for example, flexibility. Such adducts can be prepared by reacting a polyepoxide, such as, for instance, the polyglycidyl ethers of polyphenols described above, with an organic polyol having at least two alcoholic primary hydroxyls at temperatures of from about 120° C. to about 200° C. in the presence of a suitable catalyst. Various organic polyols may be utilized in the chain-extension reactions. An especially useful class of organic polyols are the various polyethylene glycols marketed under the designation Carbowax. Other organic polyols which may be utilized include low molecular weight diols, triols and higher polymeric polyols such as polyester polyols. Of these, the polyester polyols, particularly the polycaprolactone polyols, such as those described in U.S. Pat. No. 3,169,945 to Hostettler, are especially useful.

It should be noted that while such chain-extended polyepoxide adducts can impart desirable properties to films formed from the compositions herein, they may also adversely affect other properties such as stain resistance. Accordingly, in applications where extremely high levels of stain resistance are required, only minor amounts of such chain-extended polyepoxide adducts should be utilized. In such cases, it is preferred to limit the amount of such adducts to 40 percent by weight or less of the total polyepoxide component employed in the polymeric composition.

Aminoplast resins are the condensation products of an aldehyde, e.g., formaldehyde, acetaldehyde, crotonaldehyde, and benzaldehyde with an amino-or amido-group containing substance, e.g., urea, melamine, and benzoguanamine. Products obtained from the reaction of alcohols and formaldehyde with melamine, urea or benzoguanamine are preferred in the aqueous based coating compositions because of their good water dispersibility. Useful alcohols used to make the etherified products are the monohydric alcohols, such as methanol, ethanol, propanol, butanol, hexanol, benzylalcohol, cyclohexanol, 3-chloropropanol, and ethoxyethanol. An etherified melamine-formaldehyde resin is the preferred aminoplast resin. U.S. Pat. No. 4,075,141, Porter et al, Feb. 21, 1978 contains a description of useful aminoplast resins and is incorporated herein by reference.

Phenoplast resins include the condensation product of an aldehyde with a phenol. Formaldehyde and acetaldehyde are preferred aldehydes. Various phenols can be used, e.g., phenol per se, cresol, p-phenylphenol, p-tert-butylphenol, p-tert-amylphenol and cyclopentylphenol. The methylolphenol ethers described in U.S. Pat. No. 2,597,330 (herein incorporated by reference) are especially useful.

. Several different polyisocyanate crosslinking agents can be used. Examples include the aliphatic compounds such as trimethylene, tetramethylene, pentamethylene, hexamethylene, 1,2-propylene, 1,2 butylene, 2,3-butylene, 1,3-butylene, ethylidine and butylidene diisocyanates; the cycloalkylene compounds such as 1,3-cyclopentane, 1,4-cyclohexane and 1,2-cyclohexane diisocyanates; the aromatic compounds, such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-tolylene, or mixtures thereof, 4,4'-toluidine, and 1,4-xylylene diisocyanates; the nuclear-substituted aromatic compounds, such as dianisidine diisocyanate, 4,4'-diphenylether diisocyanate and chlorodiphenylene diisocyanate; the triisocyanates such as triphenyl methane-4,4',4"-triisocyanate, 1,3,5-triisocyanate benzene and 2,4,6-triisocyanate toluene; and the tetraisocyanates such as 4,4'-diphenyldimethyl methane-2,2', 5,5'-tetraisocyanate and the polymerized polyisocyanates such as tolylene diisocyanate dimers and trimers.

A number of blocked or semi-blocked polyisocyanates are satisfactory crosslinking agents. These agents are well known in the art. Generally, the organic polyisocyanates are blocked with a volatile alcohol, epsiloncaprolactone or ketoxime. These blocked polyisocyanates become unblocked at elevated temperatures, e.g. above about 100° C. "The Chemistry of Organic Film Formers", Robert E. Kreiger Pub. Co., copyrighted 1977, by D. H. Solomon, pages 216–217, contains a description of many blocked isocyanates that can be used here. The disclosure of this publication is herein incorporated by reference.

The amounts of crosslinking agent included in the compositions of the invention should be sufficient to provide a crosslinked product upon interreaction with the ungelled amidation product but may vary considerably, depending upon desired properties. Usually from about 5 to about 95 percent by weight of the crosslinking resin, based upon the combined weight solids of the ungelled amidation product and crosslinking resin may be employed, with a preferred amount being from about 25 percent to about 75 percent by weight and the balance being the ungelled product. The crosslinking resin and ungelled product are mixed in the proper proportions shortly prior to use. The mixed composition has a pot life of up to about 10 hours at ambient temperatures.

Other additives conventionally included in coating compositions can be added. Such additives include pigments, dyes, fillers, plasticizers, antioxidants, flow control agents, surfactants and thickeners.

The compositions of the invention are applied over a variety of substrates, including wood, wallboard, cinderblock walls and other substrates requiring a high level of stain and solvent resistance. The compositions are especially useful for the coating of walls of public buildings.

The compositions can be applied by any conventional method, including brushing, rolling, dipping, flow coating, roll coating and spraying. The compositions can be cured by baking at moderate or elevated temperatures. However, the compositions are curable at ambient conditions.

The following examples are illustrative of the invention with Example II representing a preferred mode.

EXAMPLE I

An interpolymer based on butyl acrylate and acrylic acid (BA:AA=90:10) is first formed in this example. A reaction vessel equipped with stirring means and a nitrogen sparge is initially charged with 722.5 grams of dipropylene glycol monomethyl ether (DPM) and 60 milliliters of denatured ethanol. The solvents are heated to reflux at about 130° C. At this point, 900.0 grams of butyl acrylate and 100.0 grams of acrylic acid are added to the reaction vessel over a two-hour period. The temperature is maintained at reflux. Concurrently, 95.3 grams of tertiary butyl peracetate solution, 50% solids (available from Lucidol Corp. as Lucidol 75M) and 46.9 grams of DPM are added over a $2\frac{1}{2}$ hour period. The reaction mixture is held at the reflux temperature for an additional hour, after which time the temperature is raised to 180° C. to strip volatile components from the vessel. Next, 140.5 grams of DPM and 555.6 grams of $NH_2$-$[CH(CH_3)CH_2O]_{5.6}CH_2CH(CH_3)$—$NH_2$ (available from the Jefferson Chemical Co., Inc. as Jeffamine D-400) are charged to the vessel. The reaction mixture is again allowed to reflux at about 170° C. for about $1\frac{1}{2}$ hours. The mixture is cooled to about 158° C. and then 69.4 grams of water and 335.0 grams of ethylene glycol monoethyl ether are added.

The reaction product has a solids content of 52.7 percent, acid value of 19.2, an amine equivalent value of 1672 and a Gardner-Holdt viscosity of I.

EXAMPLE II

Following the procedure described in Example I, a reaction vessel is charged with 788.0 grams of dipropylene glycol monomethyl ether (DPM) and 65 milliliters of denatured ethanol. The mixture is heated to reflux, i.e., about 130° C. At this point, 730.0 grams of isobutyl methacrylate and 312.6 grams of acrylic acid (IBMA to AA=70:30) are added over a two-hour time period. At the same time, 104.0 grams of tertiary butyl peracetate solution (50% solids) and 14.4 grams of DPM are added over a $2\frac{1}{2}$ hour period. The reaction mixture is then held for one hour, at which time the mixture is heated to 180° C. to strip volatiles from the vessel. 65 grams of DPM are now added, followed by the addition of 499.2 grams of $NH_2[CH(CH_3)CH_2O]_{2.6}CH_2CH(CH_3)$—$NH_2$ (available from Jefferson Chemical Co., Inc. as Jeffamine D-230). The mixture is now heated to reflux, i.e., about 160° C., and held for five hours. After this time period, the mixture is cooled while 700.0 grams of DPM are added.

The resultant reaction mixture contains 51.6 percent solids, has an acid value of 52.2 and an amine equivalent value of 1188.

EXAMPLE III

The isobutyl methacrylate acrylic acid interpolymer described in Example II is used in this example. Thus, 1,721.0 grams of the described interpolymer is charged to a reaction vessel and heated to 130° C. At this point, 396.0 grams of $NH_2[CH(CH_3)CH_2O]_{5.6}CH_2CH(CH_3)$—$NH_2$, available from the Jefferson Chemical Co. as Jeffamine D-400, is charged and heated to reflux. The mixture is allowed to reflux for about $1\frac{1}{2}$ hours. Thereafter, the mixture is cooled while adding 64.1 grams of water and 309.1 grams of ethylene glycol monoethyl ether.

The reaction mixture has a solids content of 53.3 percent, an acid value of 60.4, an amine equivalent value of 933.8 and a Gardner-Holdt viscosity of Z-6.

EXAMPLE IV

Following the procedure of Example I, a reaction vessel is charged with 448.5 grams of dipropylene glycol monomethyl ether (DPM) and 45 milliliters of denatured ethanol. The mixture is heated to reflux, at which time 437.7 grams of ethyl acrylate, 186.0 grams of acrylic acid (EA:AA=70:30), 59.1 grams of tertiary butyl peracetate solution (50% solids) and 29.1 grams of DPM are added over a $2\frac{1}{2}$ hour time period. The mixture is then held for one hour and then stripped at 180° C. At this point, 118 grams of DPM and 1,239.7 grams of $[H_2N$—$CH(CH_3)CH_2O$—$_xCH_2]_3$—$CCH_2CH_3$, sum of x groups=5.3, available from the Jefferson Chemical Co. as Jeffamine T-403, are added and heated to reflux. The mixture is held for $1\frac{1}{2}$ hours. The mixture has an acid value of 50 and an amine equivalent of 299. The mixture is then cooled while adding 43.3 grams of water and 208.8 grams of ethylene glycol monoethyl ether.

The resultant product has a solids content of 64.6 percent, an acid value of 37.8, an amine equivalent value of 394 and a Gardner-Holdt viscosity of Z-6.

EXAMPLE V

A reaction vessel equipped as in Example I is charged with 358.8 grams of dipropylene glycol monomethyl ether (DPM) and 45 milliliters of denatured alcohol and then heated to reflux, i.e., 130° C. At this point, 198.6 grams of ethyl acrylate, 49.6 grams of styrene and 248.3 grams of acrylic acid (EA:Styrene:AA=40:10:50) are added over about 2 hours. Concurrently, 47.3 grams of tertiary butyl peracetate solution (50% solids) and 23.3 grams of DPM are added over $2\frac{1}{2}$ hours. The mixture is held for 1 hour and then heated to 180° C. to strip off volatiles. Sixty-seven (67) grams of DPM is then added, followed by the addition of 1,379.4 grams of the diamine, $NH_2[CH(CH_3)CH_2O]_{5.6}CH_2CH(CH_3)$—$NH_2$, as used in Example I. This mixture is heated to reflux and held for an additional $1\frac{1}{2}$ hours. It is then cooled by the addition of 34.5 grams of water and 166.3 grams of ethylene glycol monoethyl ether.

The product has a solids content of 72.7 percent, an acid value of 54.6, an amine equivalent value of 420.7 and a Gardner-Holdt viscosity of Z-7.

A coating composition is made by blending 8 grams of the above resin and 4 grams of diglycidyl ether of bisphenol A (available from Shell Chem. Co. as Epon 828). A film made from the coating composition has excellent resistance to acetone and alcohol.

EXAMPLE VI

An interpolymer based upon a 50:50 ratio of isobutyl methacrylate and acrylic acid is made as follows. A reaction vessel as described in Example I is initially charged with 358.8 grams of dipropylene glycol monomethyl ether (DPM) and 45 milliliters of denatured alcohol. The initial charge is heated to reflux and then has added to it 248.3 grams of isobutyl methacrylate and 248.3 grams of acrylic acid. The monomer addition is made over a 2 hour time period. At the same time, 47.3 grams of tertiary butyl peracetate solution (50% solids) and 23.3 grams of DPM are added over a 2½ hour time period. After a 1 hour hold period, the mixture is heated to 180° C. to strip out volatiles. The mixture is cooled by the addition of 70.0 grams of DPM and 1,379.3 grams of the diamine described in Example V. This mixture is heated to reflux and held there for 1½ hours. Thereafter, 34.5 grams of water and 166.3 grams of ethylene glycol monoethyl ether are added.

The resultant product has a solids content of 69.9 percent, an acid value of 47.8, an amine equivalent value of 462 and a Gardner-Holdt viscosity of Z-6.

EXAMPLE VII

A reaction vessel as described in Example I is initially charged with 168.7 grams of polypropylene glycol (M.W.=425) and 152.0 grams trimellitic anhydride, heated to 150° C. and held for 2 hours. After the 2 hour hold time, 106.0 grams of dipropylene glycol monomethyl ether is added. Thereafter, 273.2 grams of $NH_2[CH(CH_3)CH_2O]_{2.6}CH_2CH(CH_3)-NH_2$ are added and the mixture heated to reflux. The mixture is held at the reflux temperature for about 1½ hours.

The reaction mixture contains 70.3 percent solids, an acid value of 53.6, an amine equivalent value of 650 and a Gardner-Holdt viscosity of Z4+.

EXAMPLE VIII

An ammonia defunctionalized epoxide resin is reacted in this example with a polycarboxyl-containing polymer to produce a useful reaction product.

An ammonia defunctionalized epoxide resin is made by first charging 2714 grams of a diglycidyl ether of bisphenol A (available from Shell Chem. Co. as Epon 828) and 114 grams ethylene glycol monohexyl ether to a reaction flask and heating to 70° C. Next 296 grams of a 28 percent aqueous ammonia solution is added under the surface of reaction mixture over about 20 minutes and then held for two hours. Three hundred (300) grams of solvent is next stripped off. The resultant defunctionalized epoxide resin has an amine equivalent of 3333.

A polycarboxyl-containing polymer is made in a manner similar to that described in Example I using 3285 grams of isobutylmethacrylate and 1407 grams acrylic acid. The polymer has an acid value of 107.1.

The reaction product of this invention is made by charging 45.8 grams of the above described polycarboxyl-containing polymer to vessel, heating to 110° C., adding 165.7 grams of the ammonia defunctionalized epoxide resin, heating to reflux, holding at that temperature for one and a half hours and adding 15.7 grams DPM. The ungelled reaction product has an acid value of 21.6.

A film is made by mixing 19.0 grams of the above described product and 1.0 grams of Epon 828 and drawing down the blend on a substrate. The dried film was tough and resistant to water, alcohol and acetone.

EXAMPLE IX

An ungelled resin of this invention based on isobutyl methacrylate and acrylate acid (70:30) is illustrated in this example.

A reaction vessel, which is equipped as in Example I is initially charged with 847.3 grams DPM and 91.3 grams denatured ethanol and heated to reflux. Next, the vessel is charged with 784.7 grams isobutyl methacrylate, 335.8 grams acrylic acid and 11.2 grams isooctyl thioglycolate from one funnel and 111.7 grams tertiary butyl peracetate solution (50% solids) from another funnel over a 2-2 ½ hour period. Reflux is maintained during the charge period. An additional 15.6 grams DPM is added as rinses and the mixture refluxed for an hour. At this point, 380 grams is distilled off and then 380 grams DPM added back. The mixture is supplied and found to have an acid number of 70.4.

The above mixture is next reacted with 268.4 grams $NH_2[CH(CH_3)CH_2]2.6CH_2CH(CH_3)NH_2$ at reflux conditions. After three hours, an amine mixture of 351.2 grams $NH_2[CH(CH_3)CH_2O]2.6OH_2CH(CH_3)NH_2$ and 351.2 grams of $NH_2[CH(CH_3)CH_2O]5.6CH_2CH(CH_3)NH_2$ is added. The mixture is cooled to about 90° C. and has added to it 737.6 grams ethylene glycol monoethyl ether.

The final product contains 49.9 percent solids and has an acid number of 44.1.

EXAMPLE X

Coating compositions based on the amine group containing addition interpolymers of the previous examples are formulated as follows:

| Composition (Parts by weight) | A | B | C |
|---|---|---|---|
| Interpolymer solution of Example IV (64.6% solids) | 200 | — | — |
| Interpolymer solution of Example V (72.7% solids) | — | 210 | — |
| Interpolymer solution of Example VI (69.9% solids) | — | — | 231 |
| Polyepoxide resin[1] | 280 | 280 | 280 |
| Titanium dioxide | 396 | 396 | 396 |
| Silica | 158 | 158 | 158 |
| Propylene glycol monomethyl ether | 70 | 70 | 70 |
| Dipropylene glycol monomethyl ether | 70 | 70 | 70 |
| Surfactant[2] | 24 | 24 | 24 |
| Water | 209 | 209 | 209 |

[1]An epichlorohydrin-bisphenol A resin available from Shell Chem. Co. as EPON 834.
[2]Available from GAF Corp. as Igepal CO-897.

The above compositions are each applied to metal and polypropylene substrates to form 3 mil films. All the coatings cured within three days at room temperature to form durable films. Each of the films is able to separately withstand 100 double rubs with acetone, denatured ethanol and xylene.

EXAMPLE XI

Two-pack coating compositions wherein one pack contains the amine group containing interpolymer of this invention and one pack contains various epoxy resins are made. The first pack consists of the interpolymer solution of Example II (51.6% solids). The second pack is one of the following compositions:

| Composition | A | B | C | D |
|---|---|---|---|---|
| Polyglycidyl ether of bisphenol A[1] | 31.0 | — | — | — |
| Diepoxide[2] | — | 31.0 | — | — |
| Aliphatic diepoxide[3] | — | — | 31.0 | — |
| Water dispersed diepoxide[4] | — | — | — | 31.0 |
| Nonyl phenoxy polyethylene oxyethanol[5] | 1.2 | 1.2 | 1.2 | 1.2 |
| Glycol diepoxide[6] | 2.4 | 2.4 | 2.4 | 2.4 |
| Sodium sulfosuccinate[7] | 1.0 | 1.0 | 1.0 | 1.0 |
| Phosphate ester[8] | 0.2 | 0.2 | 0.2 | 0.2 |
| Titanium dioxide | 34.6 | 34.6 | 34.6 | 34.6 |
| Silica pigment | 2.2 | 2.2 | 2.2 | 2.2 |
| Water | 27.4 | 27.4 | 27.4 | 27.4 |
| | 100.0 | 100.0 | 100.0 | 100.0 |

[1] Available from Shell Chem. Co. as EPON 828
[2] Available from General Mills Co. as GY 9513
[3] Available from Celanese Corp. as ER-5044.
[4] Available from Celanese Corp. as WD 510
[5] Surfactant available from GAF Corp. as Igepal CO-897
[6] Flexibilizer available from Shell Chem. Co. as DER 732
[7] Surfactant available from American Cyanamid Co. as Aerosol TR-70
[8] Surfactant available from Dexter Chem. Co. as Strodex SEK-50

The first pack is individually blended with each of the second pack compositions on a 1:1 volume basis. The blended compositions all have pot-lives in excess of 6 hours at room temperature. Films formed from the blended compositions all cure to form tack-free films having good stain resistance and chemical resistance.

EXAMPLE XII

The following illustrates a two-pack coating composition. The first pack has the following composition:

| | % |
|---|---|
| Interpolymer solution of Example IX (49.9% solids) | 55.5 |
| Titanium dioxide pigment | 10.0 |
| Silica pigment | 13.5 |
| Water | 21.0 |
| | 100.0 |

The second pack has the following composition:

| | % |
|---|---|
| Polyglycidyl ether of bisphenol A[1] | 27.6 |
| Nonyl phenoxy polyethylene oxyethanol[1] | 1.3 |
| Glycol diepoxide[1] | 5.1 |
| Titanium dioxide | 31.8 |
| Silical pigment | 2.1 |
| Water | 32.1 |
| | 100.0 |

[1] As used in Example XI.

The compositions when blended on a 1:1 volume basis have a pot-life of more than hours at room temperature and form durable stain resistant films when applied to a number of different substrates.

What is claimed is:

1. An ungelled amidation product containing primary amine groups, secondary amine groups or a mixture thereof and carboxyl groups obtained by the reaction of (1) a polyamine containing aliphatic amine groups and having at least one ether group with (2) a polycarboxyl-containing material selected from the group consisting of an acrylic resin, polyester resin, polyamide resin, or mixture thereof and wherein the carboxyl content of the polycarboxyl-containing material ranges from about 0.5 milliequivalents to about 12 milliequivalents of carboxyl per gram.

2. The product of claim 1 wherein the polyamine has the formula:

$$H_2N-(C_nR_aH_{2n-a}O)_x-R'-NH_2$$

where n is from 2 to 6, a is from 0 to 2, R is H, $CH_3$ or $C_2H_5$, x is from 1 to 60, and R' is an alkylene group having from 2 to 6 carbon atoms.

3. The product of claim 2 where n is 2.

4. The product of claim 2 where n is 3.

5. The product of claims 2, 3 or 4 where x is from 1 to 40.

6. The product of claim 5 where R is $-CH_3$.

7. The product of claim 5 where R is H.

8. The product of claim 6 wherein n is 3, a is 1, R is $-CH_3$, R' is propylene and x is from 1 to 40.

9. The product of claim 1 wherein the polyamine has the formula:

$$[H_2N-(C_nR_aH_{2n-a}O)_x]_y-Z$$

where n is from 2 to 4, a is from 0 to 2, R is H, $CH_3$ or $C_2H_5$, x is from 1 to 60, y is 2 to 10 and Z is an alkyl, aryl or alkylaryl group.

10. The product of claim 9 wherein n is 3, a is 1, R is $-CH_3$ and y is 3.

11. The product of claim 1 wherein the polyamine is an ammonia defunctionalized epoxide resin.

12. The product of claim 1 wherein the polycarboxyl-containing material is an acrylic resin.

13. The product of claim 12 wherein the polycarboxyl-containing material is an acrylic resin derived from about 25 percent to about 97 percent of an acrylic or methacrylic ester and from about 3 percent to about 75 percent of acrylic acid or methacrylic acid.

14. The product of claim 13 wherein the product is water-soluble or -dispersible.

15. The product of claim 1 wherein the molar ratio of the polyamine to the polycarboxyl-containing material ranges from about 3:1 to about 1:4.

16. The product of claim 15 wherein the polyamine is reacted with the carboxyl-containing material at a temperature ranging from about 125° C. to about 230° C. so as to react with from about 5 percent to about 70 percent of the carboxyl groups.

17. A coating composition consisting essentially of:
(a) from about 5 percent to about 95 percent of an ungelled amidation product containing primary amine groups, secondary amine groups or a mixture thereof and carboxyl groups obtained by the reaction of (1) a polyamine containing aliphatic amine groups and having at least one ether group with (2) a polycarboxyl-containing material selected from the group consisting of an acrylic resin, polyester resin, polyamide resin, or a mixture thereof and wherein the polycarboxyl-containing material has a carboxyl content ranging from about 0.5 milliequivalents to about 12 milliequivalents of carboxyl per gram; and
(b) from about 5 percent to about 95 percent of a crosslinking resin.

18. The coating composition of claim 17 wherein the crosslinking resin is selected from the group consisting of polyepoxide resins, aminoplast resins, phenoplast resins, polyisocyanates, semi-blocked polyiscyanates, blocked polyisocyanates and mixtures thereof.

19. The coating composition of claim 18 wherein the crosslinking resin is a polyepoxide having a 1,2-epoxy equivalency of greater than 1.0.

20. The coating composition of claim 19 wherein the polyepoxide has a molecular weight of below about 6,000.

21. The coating composition of claim 20 wherein the polyepoxide is a polyglycidyl ether of a polyphenol.

22. The coating composition of claims 17 or 19 wherein the polyamine has the formula:

$$H_2N-(C_nR_aH_{2n-a}O)_x-R'-NH_2$$

where n is from 2 to 6, a is from 0 to 2, R is H, $CH_3$ or $C_2H_5$, x is from 1 to 60, and R' is an alkylene group having from 2 to 6 carbon atoms.

23. The coating composition of claim 22 where n is 2.

24. The coating composition of claim 22 where n is 3.

25. The coating composition of claim 23 where x is from 1 to 40.

26. The coating composition of claim 25 where R is $-CH_3$.

27. The coating composition of claim 22 where the polyamine has the formula $[H_2N-C_nR_aH_{2n-a}O)_x\text{-}]_y-Z$ where n is from 2 to 4, a is from 0 to 2, R is H, $CH_3$ or $C_2H_5$, x is from 1 to 60, y is 2 to 10 and Z is an alkyl, aryl, or alkylaryl group.

28. The coating composition of claim 22 wherein the polyamine is an ammonia defunctionalized epoxide resin.

29. The coating composition of claim 17 wherein the polycarboxyl-containing material is an acrylic resin.

30. The coating composition of claim 17 wherein the molar ratio of the polyamine to the polycarboxyl-containing material ranges from about 3:1 to about 1:4.

31. The coating composition of claim 17 wherein the composition is aqueous.

* * * * *